United States Patent [19]
Yen

[11] Patent Number: 5,668,566
[45] Date of Patent: Sep. 16, 1997

[54] WIRELESS COMPUTER PICTURE TRANSMISSION DEVICE

[76] Inventor: Kerl Yen, No. 3, Tzu Chiang I Rd., Chung Li City, Tao Yuan Hsien, Taiwan

[21] Appl. No.: 729,580

[22] Filed: Oct. 11, 1996

[51] Int. Cl.⁶ .................................................. G09G 5/12
[52] U.S. Cl. .............................. 345/2; 345/132; 345/213
[58] Field of Search ................................. 345/132, 150, 345/155, 213, 2

[56] References Cited

U.S. PATENT DOCUMENTS

| 5,404,153 | 4/1995 | Kim | 345/132 |
|---|---|---|---|
| 5,502,462 | 3/1996 | Mical et al. | 345/185 |
| 5,530,892 | 6/1996 | Hwang | 345/168 |
| 5,574,478 | 11/1996 | Bril et al. | 345/132 |

*Primary Examiner*—Richard Hjerpe
*Assistant Examiner*—Ricardo Osorio
*Attorney, Agent, or Firm*—Morton J. Rosenberg; David I. Klein

[57] ABSTRACT

A wireless computer picture transmission device including a VGA port, a VGA converter, a video signal compositor, a low pass filter, a first video signal buffer amplifier, a second video signal buffer amplifier, a third video signal buffer amplifier, a transmitter module, a CPU, a synchronous detection circuit, a first switch, a second switch, and an electronic switch, and controlled to process computer signal from a PC into radio signal and to transmit it to a radio receiver at a TV set or projector, so that the user can monitor the data of the computer through the TV set or projector.

4 Claims, 2 Drawing Sheets

WIRELESS COMPUTER PICTURE TRANSMISSION DEVICE

BACKGROUND OF THE INVENTION

The present invention relates to a wireless computer picture transmission device which permits stored picture and data of a computer to be transmitted to a TV set, projector, A/V equipment, etc., without the use of wires.

When sending stored picture and data from a personal computer to a TV set, projector, A/V equipment, etc., a transmission cable shall be used for communication therebetween. However, installation a communication cable is complicated and time-consuming.

SUMMARY OF THE INVENTION

It is the main object of the present invention to provide a wireless computer picture transmission device which permits stored picture and data of a computer to be transmitted to a TV set, projector, A/V equipment, or any peripheral equipment without the use of wires. According to the present invention, the wireless computer picture transmission device comprises a VGA port, a VGA converter, a video signal compositor, a low pass filter, a first video signal buffer amplifier, a second video signal buffer amplifier, a third video signal buffer amplifier, a transmitter module, a CPU, a synchronous detection circuit, a first switch, a second switch, and an electronic switch, and is adapted for processing computer signal from a PC into radio signal and transmitting it to a radio receiver at a TV set or projector, so that the user can monitor the data of the computer through the TV set or projector.

DETAILED DESCRIPTION OF THE PREFERRED EMBODIMENT

Figure 1:
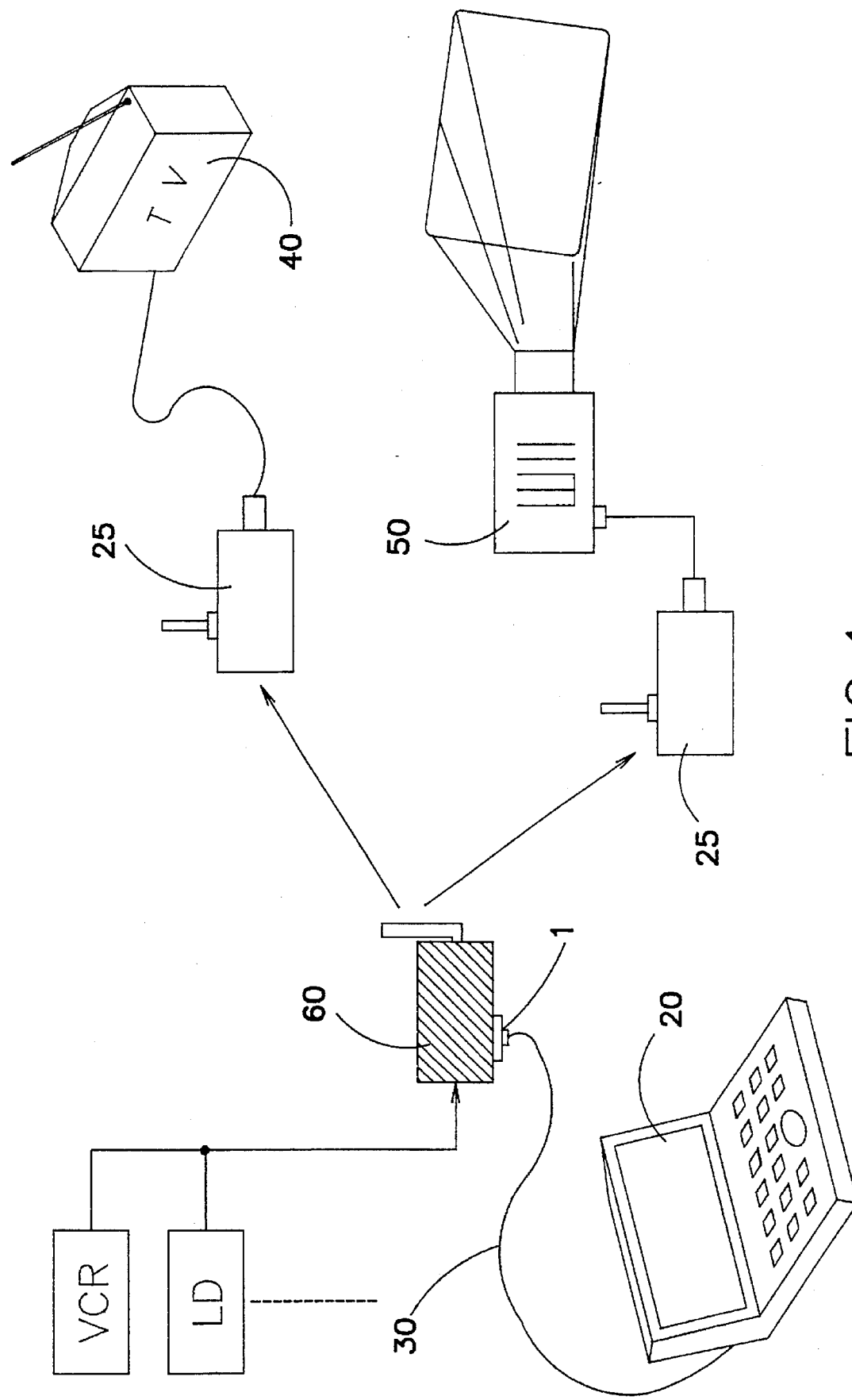
FIG. 1 is a circuit block diagram of the present invention.

Referring to FIG. 1, a wireless computer picture transmission device in accordance with the present invention is generally comprised of VGA (video graphics array) port 1, VGA converter 2, a video signal compositor 3, a low pass filter 4, a first video signal buffer amplifier 5, a second video signal buffer amplifier 6, a third video signal buffer amplifier 7, a transmitter module 8, a CPU (central processing unit) 9, a synchronous detection circuit 10, a first switch SW1, a second switch SW2, and an electronic switch SW3.

Figure 2:
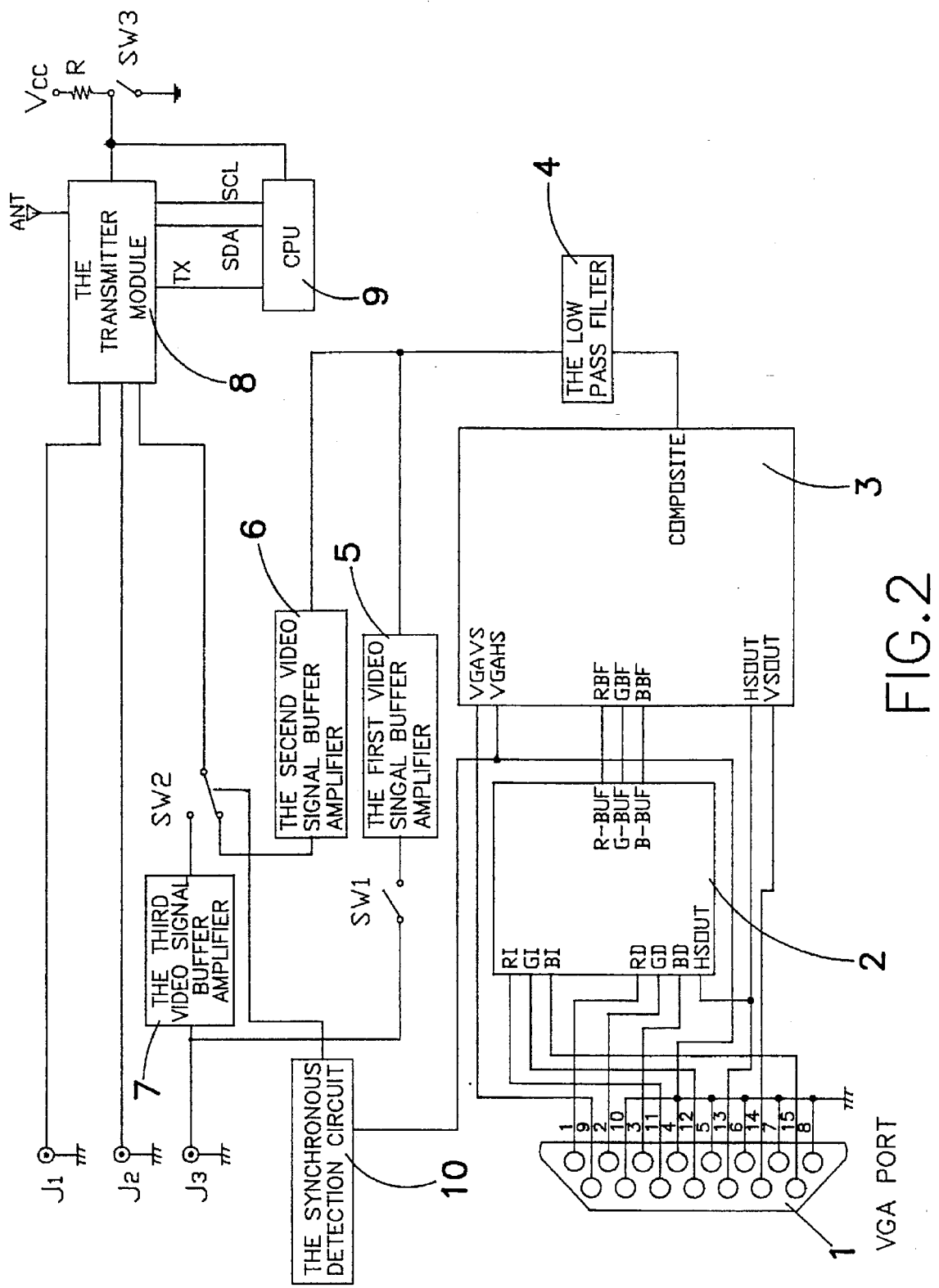
FIG. 2 is an application example of the present invention.

Referring to FIG. 2 and FIG. 1 again, the 15-pin VGA port 1 of the wireless computer picture transmission device, referenced by 60, is connected to a PC (personal computer) 20 by a cable 30. The VGA converter 2 is connected between the VGA port 1 and the video signal compositor 3, and adapted for converting the output signal of the PC 20 into a corresponding R.G.B. signal, permitting the R.G.B. signal to be further composed in a corresponding video signal. The low pass filter 4 is connected to the output end of the video signal compositor 3 to remove noises from the video signal. The output end of the low pass filter 4 is connected in parallel to the first video signal buffer amplifier 5 and the second video signal buffer amplifier 6. The first video signal buffer amplifier 5 and the second video signal buffer amplifier 6 match the impedance, and ensure accurate amplitude of the video signal. The output end of the first video signal buffer amplifier 5 is connected to the normal open contact of the first switch SW1. The common contact of the first switch SW1 is connected to J3 terminal and the input end of the third video signal buffer amplifier 7. When the first switch SW1 is maintained in the normal close status, the outputted video signal of the first video signal buffer amplifier 5 is allowed to be transmitted out of J3 terminal to a receiver 25 at a TV set 40 or projector 50 for picture monitoring. The output end of the second video signal buffer amplifier 6 is connected to the normal close contact of the second switch SW2. The normal open contact of the second switch SW2 is connected to the output end of the third video signal buffer amplifier 7. The common contact of the second switch SW2 is connected to the transmitter module 8. By means of the control of the second switch SW2, the video signal and A/V signal can be transmitted from the second video signal buffer amplifier 6 or the third video signal buffer amplifier 7 to the transmitter module 8. The input end of the transmitter module 8 is connected to in parallel to J1 terminal and J2 terminal. The transmitter module 8 receives audio signal from J1 terminal and J2 terminal and video signal from the second switch SW2, then modulates received audio and video signals into a radio frequency signal of frequency about 2.4 Ghz or 900 Mhz, and then amplified the modulated radio frequency signal, permitting the amplified modulated radio frequency signal to be sent into the air through an antenna ANT. Further, the transmitter module 8 is connected to the CPU 9 and the electronic switch SW3. The CPU 9 controls the selection of the frequency of the radio frequency signal and the operation of the electronic switch SW3. Through the CPU 9, the user can switch on the electronic switch SW3 to let modulated computer signal to be sent into the air. The second switch SW2 is connected to one end of the synchronous detection circuit 10. The opposite end of the synchronous detection circuit 10 is connected to the VGA converter 2 and the video signal compositor 3. By means of the driving of the synchronous detection circuit 10 and the control of the electronic switch SW3, computer signal obtained through the VGA port 1 has the priority to be firstly sent out.

As indicated, the present invention provides a wireless computer picture transmission device which combines computer and communication into a whole, for permitting computer picture and data to be transmitted to a TV set, projector, A/V equipment, etc., without the use of wires.

It is to be understood that the drawings are designed for purposes of illustration only, and are not intended as a definition of the limits and scope of the invention disclosed.

What the invention claimed is:

1. A wireless computer picture transmission device comprising:

a VGA (video graphics array) port;

a VGA converter connected to said VGA port and adapted for converting computer picture, data signal received from said VGA port into corresponding R.G.B. signal;

a video compositor connected to said VGA converter and adapted for composing said R.G.B. signal in video signal;

a low pass filter having an input end connected to said video compositor and adapted for removing noise from said video signal, and an output end adapted for output of filtered video signal;

a first switch;

a second switch;

an electronic switch;

a first video signal buffer amplifier having an input end connected to the output end of said low pass filter, and an output end connected to an input end of a third video signal buffer amplifier through said first switch, the output end of said first video signal buffer amplifier being controlled by said first switch for signal output;

a second video signal buffer amplifier having an input end connected to the output end of said low pass filter, and an output end connected to an input terminal of said second switch, the output end of said second video signal buffer amplifier being controlled by said second switch for video signal output;

a third video signal buffer amplifier having an input end connected to said first video signal buffer amplifier through said first switch, and an output end connected to a transmitter module through said second switch for signal output;

a transmitter module having an input end connected to said second switch, and adapted for receiving audio signal from an audio equipment and video signal from said second switch, then modulating received audio and video signals into a radio frequency signal, and then amplifying the modulated radio frequency signal, permitting it to be sent into the air through an antenna thereof by means of the control of said electronic switch;

a CPU (central processing unit) connected to said transmitter module, and adapted for controlling the selection of the frequency of radio frequency signal and the operation of said electronic switch; and a synchronous detection circuit connected between said second switch, said VGA converter and said video signal compositor, and controlled by said electronic switch for permitting computer signal obtained through said VGA port to have the priority to be firstly sent out through said transmitter module.

2. The wireless computer picture transmission device of claim 1 wherein the transmitting frequency of said transmitter module is preferably set within 2.4 GHz or 900 MHz.

3. The wireless computer picture transmission device of claim 1 wherein the input end of said third video signal buffer amplifier is connected with a terminal through which video signal obtained from said first switch is transmitted to a display of an instrument.

4. The wireless computer picture transmission device of claim 1 wherein the input end of said transmitter module is equipped with at least one terminal for connection to an audio equipment for receiving audio signal from it.

* * * * *